W. P. REID.
Combined Fly-Brushes and Casters.
No. 157,294. Patented Dec. 1, 1874.
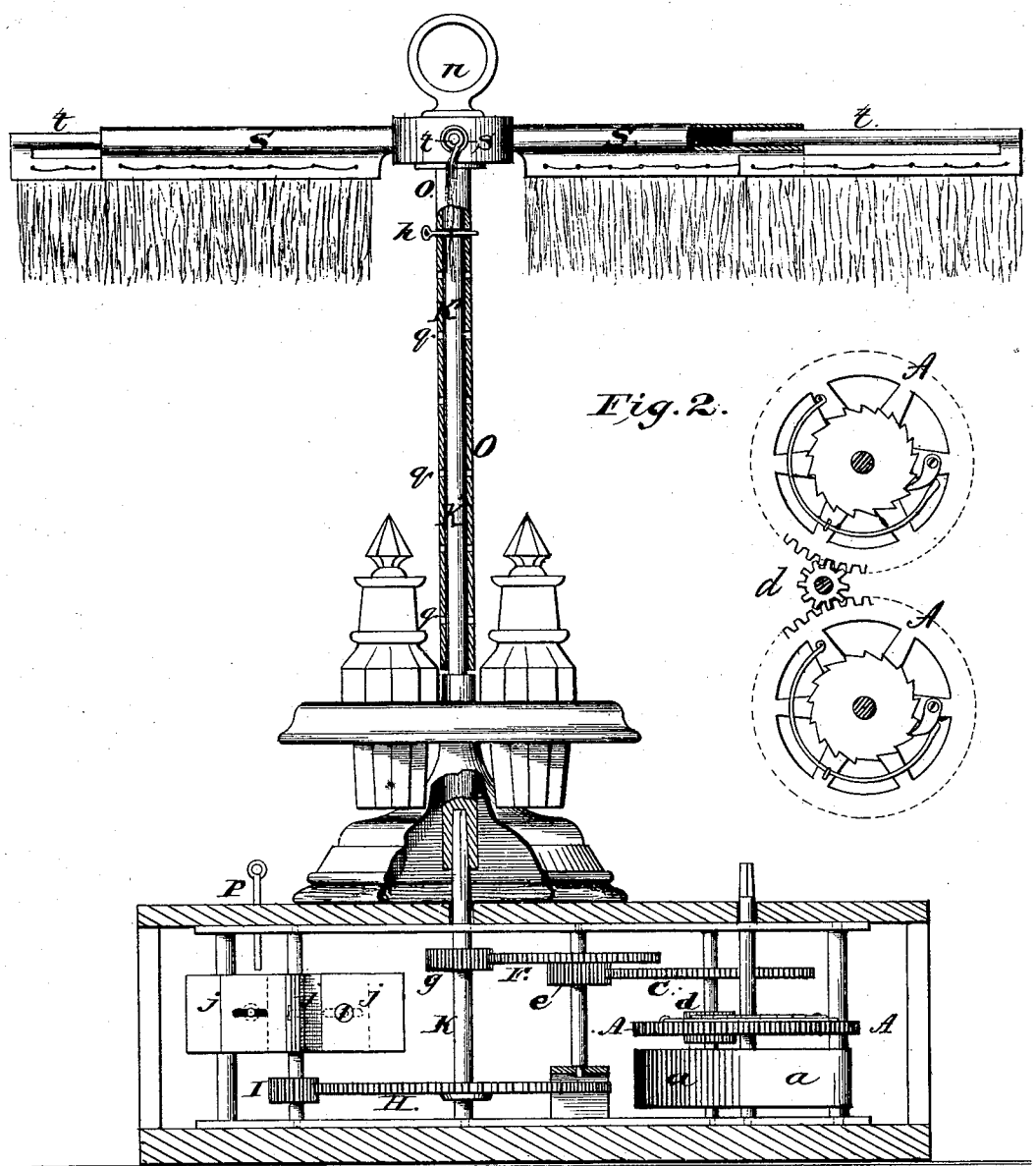

UNITED STATES PATENT OFFICE.

WILLIAM P. REID, OF TEN MILE, MISSOURI.

IMPROVEMENT IN COMBINED FLY-BRUSHES AND CASTERS.

Specification forming part of Letters Patent No. 157,294, dated December 1, 1874; application filed March 4, 1874.

*To all whom it may concern:*

Be it known that I, WILLIAM P. REID, of Ten Mile, Macon county, Missouri, have invented a Combination Fly-Brush and Caster, of which the following is a specification:

The object of my invention is an improvement in table-caster and fly-brush combined, the whole to occupy but little more space than caster alone, and the motive power being springs, the whole combination being hereinafter more fully described, and illustrated in drawing, in which—

A A are driver-wheels; *a a*, springs; C, wheel; *d*, pinion, both on same shaft, *d* working into A A, and C working into pinion *e*. F is wheel on same shaft with pinion *e*, working into pinion *g*, while H, on same shaft with pinion *g*, drives I and governor-fans *j j j j*. The shaft of wheels *e* F is shortened and rests in an elevated bar to give space to large wheel H. The governor-fans *j j j j* are in two sections each, and may be lengthened to retard motion, or vice versa. P is a wire stop. Shaft K, to which pinion *g* and large wheel H are attached, is a solid shaft extending up through metallic box containing movement far enough to attach caster and brush, the former fitting down loosely over shaft and resting upon box. At the top of K' is handle *n*. O, a metallic tube, or equivalent, fitting over K', with a key-pin, *h*, and holes *q q*, to raise or lower the shaft. The arms (four of them) *s s* are metallic tubes, or equivalent, fixed into a head-wheel fastened on tube-section O. Arms are in two sections, *s s*, hollow, with flange perforated with holes, in which to tie ribbon or other materials for the brush, and *t t* also with flange, as above, and fitting into *s s*. They may be fastened at any desired length.

I am aware that it is not new to combine a fly-brush or fan with a table-caster; but

What I claim as my invention is—

In a combined automatic fly-brush and caster, the shaft K K, adjustable metal tube O *q h*, extensible brush-arms *s t*, all constructed and arranged as described, in combination with the operative mechanism, substantially as set forth.

WILLIAM P. REID.

Witnesses:
CHARLES E. REID,
JOE D. REID.